Patented Sept. 9, 1930

1,775,461

UNITED STATES PATENT OFFICE

CLAY MENEFEE HUDSON, OF MANILA, PHILIPPINE ISLANDS

COMPOSITE MOTOR FUEL

No Drawing. Application filed January 19, 1925. Serial No. 3,482.

The invention relates to a fuel for internal combustion engines and has for its object the production of a novel composite motor fuel containing alcohol and castor oil with preferably one or more of the following ingredients—ether, acetone, gasoline, kerosene, pyridin, aniline oil and ammonia.

I have discovered that castor oil, which is a lubricant and soluble in alcohol, when added to alcohol and composite motor fuel containing a high percentage of alcohol, insures proper lubrication of the cylinders of the internal combustion engines in which the fuel is used thus preventing wear on cylinder walls and piston rings with consequent loss of compression—a common trouble with internal combustion engines using alcohol and alcohol mixtures as a motor fuel and due to a large extent to the difficulty of securing perfect combustion in engines with this class of motor-fuel particularly in engines designed for the use of gasoline. It also prevents any other engine trouble due to improper lubrication of cylinders such as the pistons becoming fast or sticking in the cylinders and possible corrosion when engine is not in daily use. The addition of castor oil to alcohol fuel renders same suitable for use in the type of engine which requires the lubrication oil to be mixed with the motorfuel and having no other system of lubrication; mineral lubrication oil ordinarily used with gasoline in this type of engine is not sufficiently soluble in alcohol to give good results when used with alcohol fuel in this class of engine.

After an internal combustion engine has become heated a mixture of from 90% to 99.9%, by volume, of alcohol and from .10% to 10%, by volume, of castor oil can be used as a motorfuel in such engine; however it is preferable to add a small quantity of pyridin, aniline oil or ammonia to neutralize any acids formed in the engine by the explosion of the fuel, and to include a substantial quantity of ether, acetone or gasoline, or a combination of any two or more of same, to render the fuel sufficiently volatile for use in cold engines. Kerosene is employed as one of the ingredients in certain formulae for denaturing alcohol and may be used to increase the power value of the fuel.

The relative proportions of compounds to be used in the composite motor fuel vary according to condition and type of engine and with atmospheric conditions and temperature but are employed substantially within the following limits, by volume, indicated: alcohol 50% or more, castor oil from .10% to 10%—internal combustion engines employing splash or pressure lubrication systems requiring very much less castor oil to be mixed with the fuel than engines which are lubricated by having the lubrication oil mixed with the fuel—ether, acetone, or gasoline—or any combination thereof—up to 49.9%, kerosene up to 10%, pyridin and/or aniline oil from .10% to 2%, ammonia, if used instead of pyridin and/or aniline oil, .05% to 1%. A typical admixture for tropical climates is alcohol 76.5%, caster oil, .5%, ether, acetone, or gasoline—or any combination thereof—20%, kerosene 2% and aniline oil 1%.

What I claim is:

1. A motor fuel comprising an admixture of alcohol, castor oil, ether and aniline oil.

2. A motor fuel comprising an admixture of alcohol, castor oil, ether, aniline oil and kerosene.

3. A motor fuel comprising an admixture of the following compounds in substantially the proportions, by volume, indicated: alcohol 76.5%, castor oil .5%, ether 20%, kerosene 2% and aniline oil 1%.

4. A motor fuel comprising an admixture of the following compounds in substantially the proportions, by volume, indicated: alcohol from 56.5% to 91.5%; castor oil .5%, ether from 5% to 40%, kerosene 2% and aniline oil 1%.

5. A motor fuel comprising an admixture of the following compounds in substantially the proportions, by volume, indicated: alcohol from 56.5% to 91.5%, castor oil from .10% to 10%, ether from 5% to 40%, kerosene from 1% to 10%, and aniline oil from .10% to 2%.

In testimony whereof I hereto affix my signature in the city of Manila, Philippine Islands, this 12th day of December, 1924.

CLAY MENEFEE HUDSON.